US010144051B2

(12) United States Patent
Friend et al.

(10) Patent No.: US 10,144,051 B2
(45) Date of Patent: Dec. 4, 2018

(54) EMERGENCY STOP CONFIGURATION FOR IRONWORKER

(71) Applicant: Edwards Manufacturing Company of Albert Lea, Albert Lea, MN (US)

(72) Inventors: Douglas Lyons Friend, Albert Lea, MN (US); Barry Eugene Barber, Shakopee, MN (US)

(73) Assignee: JPW Industries Holding Corporation, Wilmington, DE (US)

( * ) Notice: Subject to any disclaimer, the term of this patent is extended or adjusted under 35 U.S.C. 154(b) by 0 days.

(21) Appl. No.: 15/066,583

(22) Filed: Mar. 10, 2016

(65) Prior Publication Data

US 2016/0354817 A1 Dec. 8, 2016

Related U.S. Application Data

(60) Provisional application No. 62/169,841, filed on Jun. 2, 2015.

(51) Int. Cl.
| | |
|---|---|
| *B21D 55/00* | (2006.01) |
| *B23Q 11/00* | (2006.01) |
| *F16P 3/00* | (2006.01) |
| *B21B 1/22* | (2006.01) |
| *B21B 15/00* | (2006.01) |

(52) U.S. Cl.
CPC .......... *B21D 55/00* (2013.01); *B23Q 11/0078* (2013.01); *B23Q 11/0092* (2013.01); *F16P 3/00* (2013.01); *B21B 1/22* (2013.01); *B21B 15/0007* (2013.01)

(58) Field of Classification Search
CPC .......... B21B 1/22; B21B 15/0007; F16P 3/00; F16P 3/04; F16P 3/008; B21D 55/00; B23Q 11/0078; B23Q 11/0082; B23Q 11/0085; B23Q 11/0089; B23Q 11/0092
USPC ............................................. 72/705; 29/592.1
See application file for complete search history.

(56) References Cited

U.S. PATENT DOCUMENTS

| | | | | |
|---|---|---|---|---|
| 4,726,786 A | * | 2/1988 | Hill .................. | H01R 31/06 439/504 |
| 5,575,186 A | * | 11/1996 | Kempen ............... | B21J 7/46 100/257 |
| 6,568,493 B2 | * | 5/2003 | Parkert ............... | B60K 25/04 180/53.1 |

(Continued)

*Primary Examiner* — Shelley Self
*Assistant Examiner* — Mohammad Yusuf
(74) *Attorney, Agent, or Firm* — Dicke, Billig & Czaja, PLLC

(57) ABSTRACT

One aspect is a hydraulic ironworker system having a hydraulic ironworker configured with hydraulic power to deliver controlled force to metal workpieces. An accessory tool is coupled to the hydraulic ironworker via a harness assembly and configured to receive the hydraulic power from the hydraulic ironworker. A remote pushbutton assembly is selectively coupled to the harness assembly and configured to control hydraulic power from the hydraulic ironworker to the accessory tool and further configured with an emergency stop button that, when actuated, disables all power to the hydraulic ironworker system. A safety plug assembly is configured to alternately couple to the harness assembly in place of the remote pushbutton assembly. Power to the hydraulic ironworker system is disabled until one of the remote pushbutton and safety plug assemblies are attached on the harness assembly.

12 Claims, 4 Drawing Sheets

(56) References Cited

U.S. PATENT DOCUMENTS 7,214,011 B2 * 5/2007 Ryai, Sr. ................. B23C 3/35
                                                                            409/134
7,870,915 B2 * 1/2011 Beeson ................... B60P 3/14
                                                                            180/53.1

* cited by examiner

EMERGENCY STOP CONFIGURATION FOR IRONWORKER

CROSS-REFERENCE TO RELATED APPLICATIONS

This patent application claims priority under 35 U.S.C. § 119(e) to U.S. Provisional Patent Application Ser. No. 62/169,841 entitled "EMERGENCY STOP CONFIGURATION FOR IRONWORKER," having a filing date of Jun. 2, 2015, the contents of which are incorporated herein by reference.

BACKGROUND

Hydraulic ironworkers are a class of machines that can shear, notch, and punch holes in steel plate and bars. Ironworkers generate force using mechanical advantage or hydraulic systems. Modern systems use hydraulic rams powered by a heavy alternating current electric motor. High strength carbon steel blades and dies of various shapes are used to work the metal. The machine itself is made of very heavy steel to handle the enormous force that can be generated during use. Ironworkers are rated according to the force they can generate in tons. Although ironworkers are tools, just like hammers and wrenches, they also provide many more safety hazards due to the enormous power and force that they generate. For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
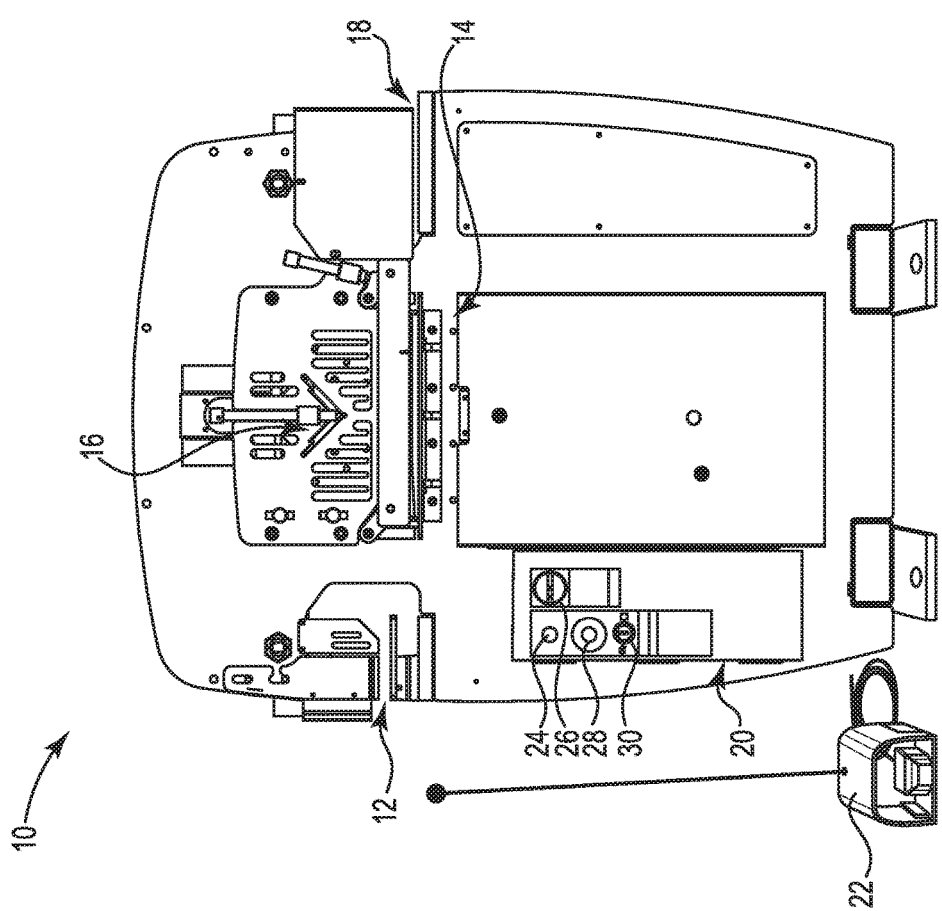
FIG. 1 illustrates one embodiment of a hydraulic ironworker.

FIG. 1 illustrates hydraulic ironworker 10 in accordance with one embodiment. In one example, ironworker 10 is a 55 ton ironworker, such as that manufactured by Edwards Manufacturing Company of Albert Lea, Minn. Ironworker 10 can be any of a variety of hydraulic ironworkers that are rated, for example, anywhere from 20 tons to as high as 150 tons. Ironworker 10 can be used for punching, shearing, notching, bending and other metal fabrication functions. Ironworker 10 uses hydraulic power to deliver controlled force to various work pieces. Ironworker 10 can be used in manufacturing or fabrication shops, maintenance departments, and vocational school to save time, increase productivity, eliminate waste and create clean smooth cuts and holes.

In one embodiment, hydraulic ironworker 10 includes punch station 12, flat bar shear station 14, angle shear station 16, coper notcher station 18, control panel 20 and foot pedal 22. Control panel 20 includes start switch 24, disconnect switch 26, emergency stop button 28, and select switch 30. Foot pedal 22 is also coupled to control panel 20.

In operation, various metal fabrication functions are performed at each of punch station 12, flat bar shear station 14, angle shear station 16, and coper notcher station 18. The motor of ironworker 10 is engaged with the toggling of start switch 24. In one embodiment, a work piece is then introduced into one of the stations 12/14/16/18 and then foot pedal 22 is actuated to engage the hydraulics to force blades and/or dies of hydraulic ironworker 10 to complete the action of punching, shearing, notching, bending or similar actions on the workpiece.

Select switch 30 can be toggled between three modes of operation: an iron worker mode, an accessory mode and an auto cut mode. When select switch 30 is in the iron worker mode, engaging the hydraulics to force the blades or dies is accomplished by stepping down on foot pedal 22. Once the user steps off foot pedal 22, the unit is disengaged after the cylinder retracts. For the shearing function, the auto cut mode can be selected such that the hydraulics are continuously enabled and will engage each time a sensor within flat bar shear station 14 senses that a work piece is in proper position and will "auto cut" each time the piece is sensed. In this auto cut mode, foot pedal 22 is disengaged. Finally, the accessory mode enables an accessory that can optionally be attached to ironworker 10, as will be discussed in more detail below.

Because ironworker 10 generates enormous forces when actuated in any of its modes, it also provides an emergency provision for shutting down completely and quickly. Accordingly, emergency stop button 28 is provided on control panel 20. If something or someone is engaged in a dangerous way with ironworker 10, pushing emergency stop button 28 cuts off all power to ironworker 10. Accordingly, once emergency stop 28 is pushed, the motor and hydraulics are disabled and there is no way for any additional force to be output by the machine. In one embodiment, emergency stop button 28 is a twist lock mushroom head that opens a circuit when depressed.

Disconnect switch 26 on control panel 20 is provided for further safety in the operation and maintenance of ironworker 10. In order to access the inside of ironworker 10, a front door panel must be opened. The door will not open, however, unless disconnect switch 26 is in the off position. Once in the off position, all incoming power to the components inside the enclosure is completely cut off. Disconnect switch 26 also has a lock out position that allows electricians or mechanics to lock into the off position with the door closed and prevent the machine from being started during maintenance or if the machine is not working properly.

Figure 2:
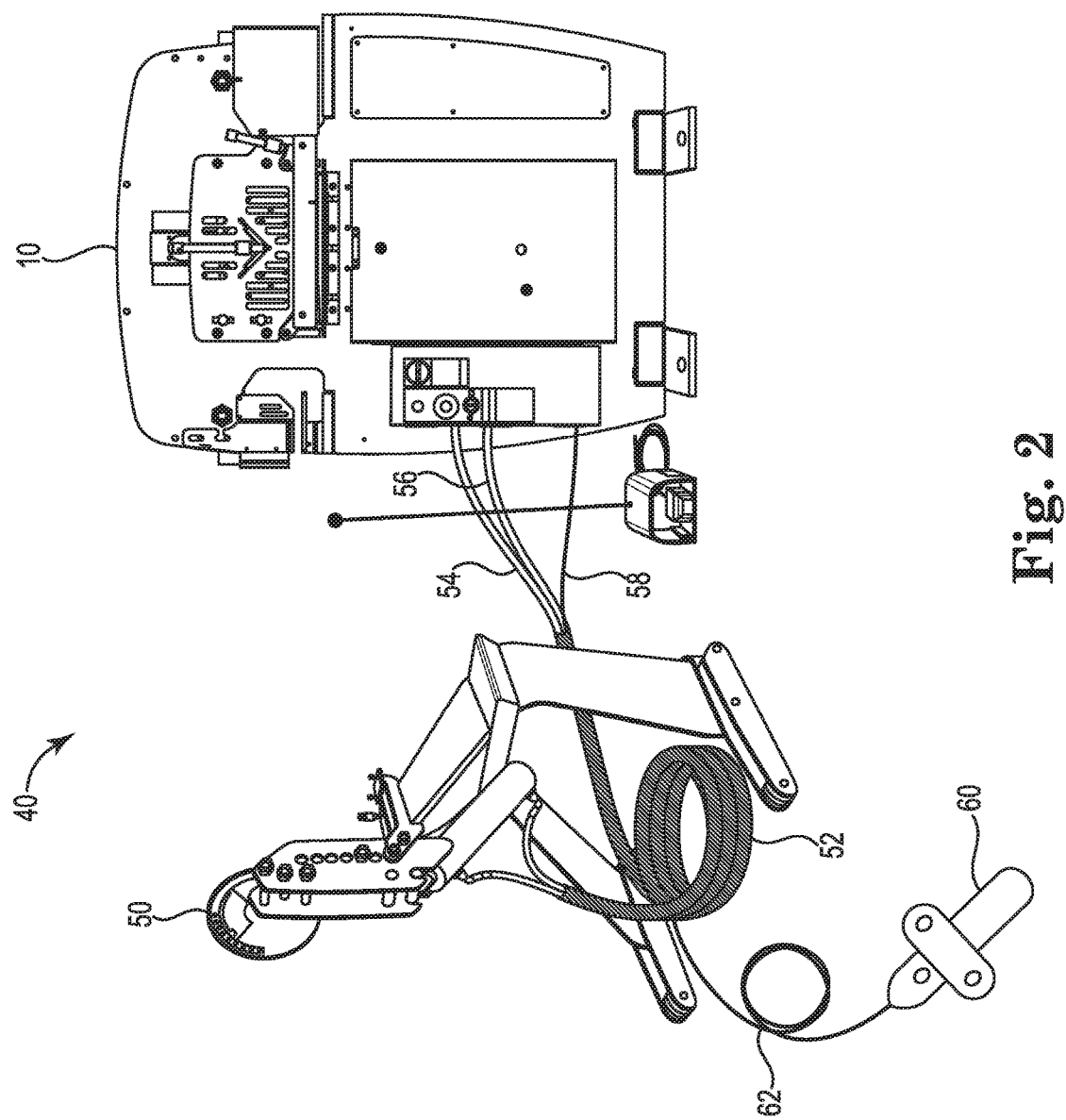
FIG. 2 illustrates an ironworker system including a hydraulic ironworker coupled to an accessory tool in accordance with one embodiment.

FIG. 2 illustrates ironworker system 40 in accordance with one embodiment. Ironworker system 40 includes ironworker 10 coupled to accessory tool 50. Accessory tool 50 can be any one of several available options that can attached to ironworker 10, such as pipe benders, shop presses, radius rollers, horizontal presses, brake presses, plate shears, plate rollers, slip rollers, welding positioners, power hammers, power shrinker/stretchers, planishing hammers, power bead rollers, automotive lifts and a variety of others.

In one embodiment, ironworker 10 is coupled to accessory tool 50 via accessory harness 52. Accessory harness 52 includes first and second hydraulic hoses 54 and 56 and includes electrical cable 58. Once coupled to ironworker 10, first and second hydraulic hoses 54 and 56 deliver the hydraulic power of ironworker 10 to accessory tool 50, such that accessory tool 50 uses the power of ironworker 10. As such, accessory tool 50 does not require its own internal power system, effectively using ironworker 10 as the power plant, and accordingly, ironworker system 40 is a very cost-effective system. Accessory tool 50 can be specifically tailored to any of a variety of applications.

Because accessory tool 50 can be located somewhat remotely from ironworker 10, by virtue of the length of accessory harness 52, ironworker system 40 also includes remote push button unit 60. Remote push button unit 60 includes controls for engaging and releasing accessory tool 50, and includes a means of cutting off all power for the entire ironworker system 40, as will be more fully discussed below. An operator can use remote push button unit 60 to control the operation of accessory tool 50 without needing to be located proximate to ironworker 10. In one embodiment, an operator can use remote push button unit 60 to execute the same functionality as available on the control panel 20 of ironworker 10, such as the iron worker mode, the accessory mode and the auto cut mode.

Figure 3:
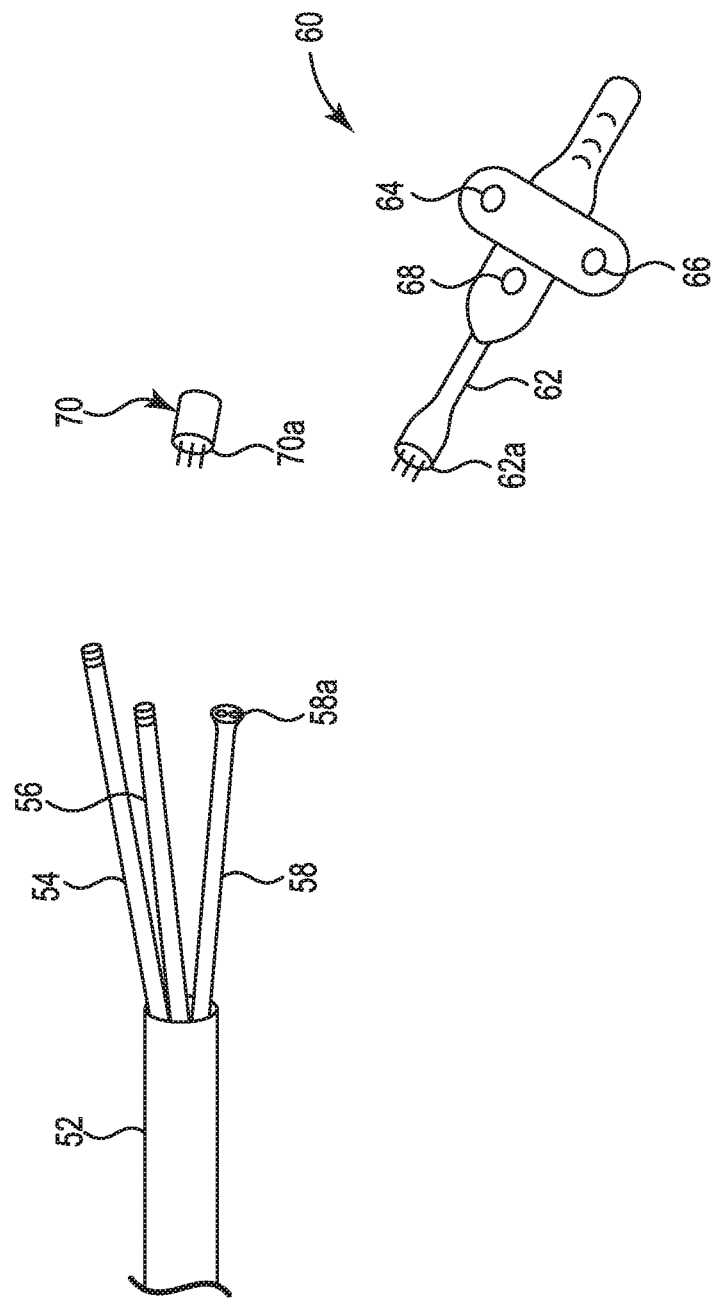
FIG. 3 illustrates a partial view of an accessory tool, including a remote unit, coupled to a hydraulic ironworker in accordance with one embodiment.

FIG. 3 illustrates further detail of remote push button unit 60 for use with accessory tool 50 in accordance with one embodiment. In one embodiment, remote push button unit 60 includes remote cable 62, extend button 64, retract button 66, and emergency stop button 68. In operation, once connected, remote push button unit 60 controls the functionality of ironworker 10 and accessory tool 50 out at remotely located accessory tool 50. Pressing the extend button 64 will cause power from ironworker 10 to be delivered to accessory tool 50 causing it to extend and pressing retract button 66 will accordingly cause it to retract.

In one embodiment, pressing emergency stop button 68 will not just stop power to accessory tool 50, but will actually cut off all power to the entire ironworker system 40, including ironworker 10. Enabling emergency stop button 68 to cut off power to the entire system 40 provides added safety in cutting off power at the source to ensure complete power loss in the event of an emergency situation.

Ironworker 10 can be provided by itself, without an accessory tool. When ironworker 10 is configured for use with accessory tool 50, however, accessory harness 52 is hard-wired into ironworker 10. As illustrated in FIG. 3, accessory harness 52 includes first and second hydraulic hoses 54 and 56, which are coupled to accessory tool 50 to provide hydraulic power thereto. Accessory harness 52 also includes electrical cable 58, which also includes female connector 58*a* out at its end intended for connection to accessory tool 50. Remote cable 62 of remote push button unit 60 also includes male connector 62*a*, which is configured to plug into female connector 58*a* in one embodiment. In this way, remote push button unit 60 is electrically coupled back to ironworker 10 in order to control hydraulic power delivery, and potentially other control functions.

Because ironworker 10 can be used directly without using accessory tool 50, even when it is equipped to be used with accessory tool 50, it is important to ensure that accessory tool 50 is properly assembled even when not in use. Accordingly, ironworker system 40 further includes safety plug assembly 70 in accordance with one embodiment. Safety plug assembly 70 is configured with male connector 70*a*, which is configured to plug into female connector 58*a* of accessory harness 52. In one embodiment, power is cut off from the entire ironworker system 40 until one of either safety plug assembly 70 or remote cable 62 is plugged into accessory harness 52. When safety plug assembly 70 is coupled to accessory harness 52, emergency stop button 28 is functional and its actuation will cut off all power to ironworker system 40. When remote cable 62 is coupled to accessory harness 52, both emergency stop button 28 and emergency stop button 68 are functional and actuation of either will cut off all power to ironworker system 40. This configuration prevents a situation where auxiliary harness 52 is mistakenly left active, but without the ability of an emergency stop function out at the remote control. The design also ensures that emergency stop button 28 is never disabled while the system is active, essentially providing redundant emergency stopping locations.

In one embodiment, ironworker system 40 can be delivered to a customer with ironworker 10 and without accessory tool 50, but including auxiliary harness 52. In this way, the customer can attach an accessory tool 50 it already owns or that it later acquires. In such a case, the customer must attach safety plug assembly 70 in order to operate ironworker 10, otherwise, system power is disabled. Once the customer adds accessory tool 50, it can swap out safety plug assembly 70 for remote cable 62, thereby enabling remote push button unit 60, including emergency stop button 68.

Figure 4:
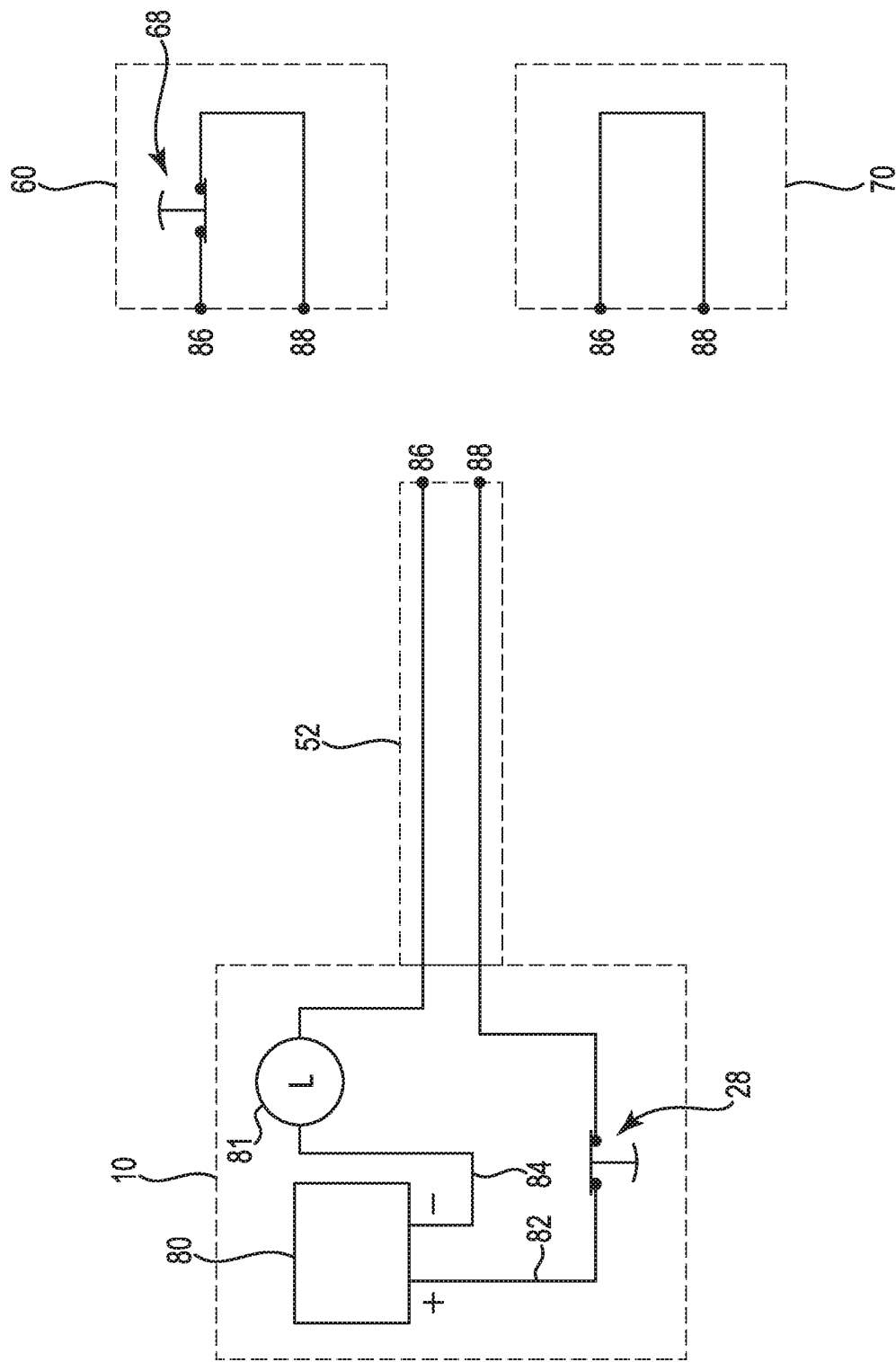
FIG. 4 is an electrical schematic illustration of a hydraulic ironworker coupled to an accessory tool in accordance with one embodiment.

FIG. 4 is a simplified electrical schematic illustrating aspects of ironworker system 40 in accordance with one embodiment. Control circuitry and most connections to various load components are eliminated in order to simplify the figure. In FIG. 4, ironworker 10, accessory harness 52, safety plug assembly 70 and remote push button unit 60 are illustrated in dotted lines so that some selected portions of the electrical connections within the various components are visible. Power supply 80 is located within ironworker 10. Power supply 80 provides power to the entire ironworker system 40, including its motor for the hydraulics and all system controls. The motor and other various loads in the system are represented by system load 81, also illustrated as within iron worker 10. In practice, system load 81 is made up of any of various motors, pressure switches, valves, lights and so forth, and they may be located within ironworker 10, or out on accessory tool 50, or at another location. For simplification of the figure, however, system load 81 is illustrated within ironworker 10.

As illustrated in FIG. 4, negative supply line 84 is coupled to the negative terminal of power supply 80 on one side and coupled to a first side of load (L) 81 on its other side. The second side of load (L) 81 is then routed from within ironworker 10 through accessory harness 52 out to first port 86 out at the end of accessory harness 52 in one embodiment. First port 86 is located at an end of accessory harness 52 that is configured to couple to either safety plug assembly 70 or remote push button unit 60. Positive supply line 82 is coupled to the positive terminal of power supply 80 on one side and coupled to a first side of emergency stop button 28 on its other side. The second side of emergency stop button 28 is coupled to second port 88 of accessory harness 52. Accordingly, pressing emergency stop button 28 breaks or electrically interrupts positive supply line 82. Second port 88 is located adjacent first port at the end of accessory harness 52 that is configured to couple to either safety plug assembly 70 or remote push button unit 60.

As also illustrated in FIG. 4, safety plug assembly 70 and remote push button unit 60 are each configured with first and second ports 86 and 88. In operation, either first and second ports 86 and 88 of safety plug assembly 70 or first and second ports 86 and 88 of remote push button unit 60 are coupled to first and second ports 86 and 88 of accessory harness 52. Within the simplified schematic illustrated, coupling safety plug assembly 70 to accessory harness 52 closes the circuit between positive and negative supply lines 82 and 84, thereby allowing power supply 80 to drive system load 81.

Similarly, coupling remote push button unit 60 to accessory harness 52 also closes the circuit between positive and negative supply lines 82 and 84, as long as emergency stop button 68 has not been depressed, thereby allowing power supply 80 to drive system load 81. Circuitry within the simplified version of remote push button unit 60 of FIG. 4 that couples to extend and retract buttons 64 and 66 is eliminated in the figure for simplification.

When neither safety plug assembly 70 nor remote push button unit 60 are coupled to accessory harness 52, there is an open circuit between positive and negative supply lines 82 and 84 such that power supply 80 is disabled, and all system power for ironworker system 40 is cut off, thereby providing an extra measure of safety protection for system 40.

FIG. 4 also illustrates that emergency stop buttons 28 and 68 will always function to cut off all power to ironworker system 40. When remote push button unit 60 is coupled to accessory harness 52, actuation of either of emergency stop buttons 28 or 68 will create an open circuit in positive supply line 82 disabling the system. Because emergency stop buttons 28 or 68 are in series with each other relative to power supply 80, pressing either one will create an open circuit condition. When safety plug assembly 70 is coupled to accessory harness 52 actuation of first emergency stop button 28 will create an open circuit in positive supply line 82 disabling the system. Because remote push button unit 60 is not connected in that condition, there is no possibility of operator confusion with respect to using emergency stop button 68. Requiring connection of safety plug assembly 70 in order to allow the system to operate provides further safety in require purposeful action by the operator even when accessory tool 50 is not intended to be used.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A hydraulic ironworker system comprising:
    a hydraulic ironworker configured with hydraulic power to deliver controlled force to metal workpieces;
    an accessory tool coupled to the hydraulic ironworker via a harness assembly and configured to receive the hydraulic power from the hydraulic ironworker;
    a remote pushbutton assembly removably coupled to the harness assembly and configured to control hydraulic power from the hydraulic ironworker to the accessory tool and further configured with an emergency stop button that, when actuated, disables all power to the hydraulic ironworker system; and
    a safety plug assembly configured to removably couple to the harness assembly in place of the remote pushbutton assembly, wherein only one of the remote pushbutton assembly and the safety plug assembly is attached to the harness assembly at one time; and
    wherein power to the hydraulic ironworker system is disabled until one of the remote pushbutton and safety plug assemblies is attached on the harness assembly.

2. The hydraulic ironworker system of claim 1, wherein the hydraulic ironworker is also configured with an emergency stop button such that actuation of either the emergency stop button on the hydraulic ironworker or actuation of the emergency stop button on the remote pushbutton assembly disables all power to the hydraulic ironworker system.

3. The hydraulic ironworker system of claim 2, wherein the emergency stop button on the hydraulic ironworker is in series electrically with the emergency stop button on the remote pushbutton assembly.

4. The hydraulic ironworker system of claim 1, wherein the accessory tool comprises one of a pipe bender, a shop press, a radius roller, a horizontal press, a brake press, a plate shear, a plate roller, a slip roller, a welding positioner, a power hammer, a power shrinker/stretcher, a planishing hammer, a power bead roller, and an automotive lift.

5. The hydraulic ironworker system of claim 1, wherein the remote pushbutton assembly comprises controls for putting the ironworker into an iron worker mode, an accessory mode or an auto cut mode.

6. The hydraulic ironworker system of claim 1, wherein the emergency stop button of either the hydraulic ironworker or the remote pushbutton assembly comprises a twist lock mushroom head that opens a circuit when depressed.

7. A hydraulic ironworker system comprising:
    a hydraulic ironworker configured with electric power and with hydraulic power to deliver controlled force to metal workpieces;
    an accessory tool coupled to the hydraulic ironworker via a harness assembly and configured to receive the electric power and the hydraulic power from the hydraulic ironworker, wherein the electric power from the hydraulic ironworker is delivered to the accessory tool via the harness assembly as an open circuit;
    a remote pushbutton assembly that, when coupled to the harness assembly, closes the open circuit thereby enabling control of the hydraulic power from the hydraulic ironworker to the accessory tool, wherein the remote pushbutton assembly is configured with an emergency stop button that, when actuated, disables all power to the hydraulic ironworker system; and
    a safety plug assembly that, when coupled to the harness assembly, closes the open circuit, wherein only one of the remote pushbutton assembly and the safety plug assembly is attached to the harness assembly at one time; and wherein power to the hydraulic ironworker system is disabled until one of the remote pushbutton and safety plug assemblies is attached on the harness assembly thereby closing the open circuit.

8. The hydraulic ironworker system of claim 7, wherein the hydraulic ironworker is also configured with an emergency stop button such that actuation of either the emergency stop button on the hydraulic ironworker or actuation of the emergency stop button on the remote pushbutton assembly disables all power to the hydraulic ironworker system.

9. The hydraulic ironworker system of claim 8, wherein the emergency stop button on the hydraulic ironworker is in series electrically with the emergency stop button on the remote pushbutton assembly.

10. The hydraulic ironworker system of claim 7, wherein the accessory tool comprises one of a pipe bender, a shop press, a radius roller, a horizontal press, a brake press, a plate shear, a plate roller, a slip roller, a welding positioner, a power hammer, a power shrinker/stretcher, a planishing hammer, a power bead roller, and an automotive lift.

11. The hydraulic ironworker system of claim 7, wherein remote pushbutton assembly comprises controls for putting the ironworker into an iron worker mode, an accessory mode or an auto cut mode.

12. The hydraulic ironworker system of claim 7, wherein the emergency stop button of either the hydraulic ironworker or the remote pushbutton assembly comprises a twist lock mushroom head that opens a circuit when depressed.

* * * * *